UNITED STATES PATENT OFFICE.

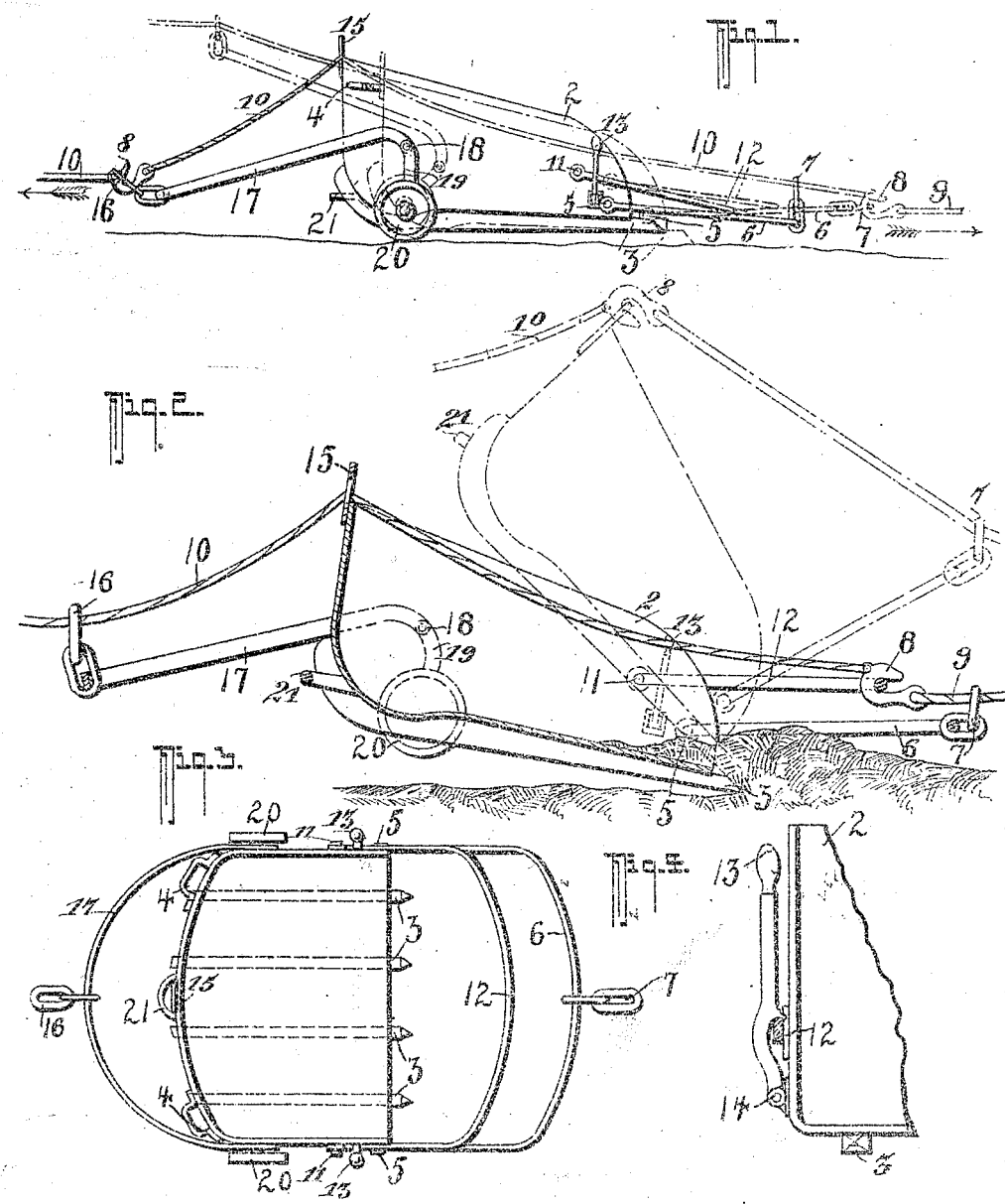

ARCHIBALD McGILLIS, OF VANCOUVER, BRITISH COLUMBIA, CANADA.

EXCAVATING-SCOOP FOR WIRE-ROPE HAUL.

1,027,876.  Specification of Letters Patent.  Patented May 28, 1912.

Application filed February 6, 1912. Serial No. 675,707.

*To all whom it may concern:*

Be it known that I, ARCHIBALD McGILLIS, citizen of the Dominion of Canada, residing at Vancouver, in the Province of British Columbia, Canada, have invented a new and useful Excavating-Scoop for Wire-Rope Hauls, of which the following is a specification.

This invention relates to an excavating scoop or scraper of that class, which is drawn by a wire rope over the ground to be excavated, and when loaded is by the same means conveyed to the dump, and my object has been to provide a scoop of this class that will, in use with an ordinary wire rope haul and haul back line, automatically disengage and engage its connecting hook from the place of its connection to the scoop and by changing this place of connection in relation to the scraping edge of the scoop will change the action of it so that the same hauling rope serves for excavating, for delivery of the scoop to the dump or place of deposit, and for overturning it there, and by the haul back the scoop may be righted and returned to the place of excavation.

The invention also comprises a provision by which, during the backward haul, a pair of wheels are drawn under the scoop and save the dragging of it on the ground, as is usual.

The invention is particularly described in the following specification, reference being made to the drawings by which it is accompanied, in which:

Figure 1 is a side elevation of the scoop, the full lines showing it as connected for the backward haul and the dot and dash lines showing the scoop as being moved in the direction of forward haul showing the movement of the backward hauling bail in lowering the scoop off the sustaining wheels onto the ground. Fig. 2 is a longitudinal section of the same showing the hauling rope as connected to the scoop for excavating and in the dot and dash lines the scoop in the act of overturning to deposit its load and the necessary connection therefor. Fig. 3 shows the scoop in plan, and Fig. 4, an enlarged detail of the check on the excavating bail.

In these drawings 2 represents a sheet metal excavating scoop having a bottom, sides and back. The scraping or excavating edge of this scoop is provided with teeth 3 projecting beyond it, which teeth are carried under the bottom and round the bend of the back to take the wear of these parts.

Toward the upper part of the sides at the back, handles 4 are secured to facilitate manipulation by the attendant.

A forward hauling bail 6 is pivoted at 5 on the sides of the scoop as close as practicable to the bottom and forward edge of it, which bail is at the middle line provided with a ring 7 for the attachment of the hook 8 of the hauling line 9. The shank of this hook 8 is passed through the ring and hooks outward and to the bend of the hook, preferably toward the point, so that the hook will hang point up is connected the haul back line 10.

The excavating bail 12 is pivotally mounted on pins 11 on each side of the scoop at a position farther back from the excavating edge, and at a height of about half the depth of the scoop. This bail 12 is shorter in its radial length than the other so as to fall well within it, as shown in Fig. 3. To this bail the hook 8 is connected when it is desired to excavate and fill the scoop.

In order to prevent the scoop from unduly digging into the earth and possibly overturning, if the earth should happen to be very tenacious or harder than usual, the upward movement of the bail 12 is limited by a hook lever 13 link connected at 14 on each side of the scoop. When this check is required the hook of it is, by means of the lever end, passed over the bail.

To the upper edge of the back of the scoop in the middle line a loop 15 is secured in which the hook of the hauling line is placed when the scoop is to be overturned.

The haul back bail 17 is pivoted at 18 on each side of the scoop toward the back and is provided with a ring 16 through which the haul back line 10 passes and against which the bend of the hook 8 engages when the line is drawn back. Each end of this bail 17 is provided, as at 19, beyond the pivots 18 and curved toward the back lower edge of the scoop and these ends are furnished with wheels 20. When the scoop is moving forward these wheels are clear of the ground, but during the backward haul the lever ends 19 of it are moved downward and forward and carry the wheels 20 under the scoop where they will sustain it and substitute the wheel resistance for the drag.

A strong loop 21 is secured to the back of the scoop near the bottom to which the haul back line may be connected when it is not desired to use the haul back bail 18, 19 with its connected wheels 20.

In use the scoop 2 is drawn to the place of excavation on its wheels 20 by the haul back line 10, the bend of the hook 8 engaging the ring 16 of the bail 17 through which the line 10 passes.

On arriving at the place of excavation the direction of haul is reversed, and the hauling line 9, which passes through the ring 7 of the bail 6, is drawn through that ring and the hook 8 automatically hooks itself into the excavating bail 12. The connection of this bail 6 to the scoop being so much above the excavating edge of it, that edge with its teeth digs in and the back of the scoop is uptilted permitting the excavating edge to scrape the ground and fill the scoop; the check hooks 13 being used where the character of the earth is particularly heavy, to limit the tilt.

When the scoop is full the hook 8 is disengaged from the excavating bail 12, and when the pull is again exerted the hook 8, the line 9 of which passes through the ring 7 of the bail 6, automatically hooks itself in that ring, and the scoop is drawn to the place of deposit, the bail being connected near the bottom edge of the scoop to prevent the excavating edge from digging in. On arrival at the place of deposit, the hook 8 is, by the attendant, connected into the overturning loop 15 on the back edge of the scoop, and further forward haul overturns the scoop and deposits the contents.

When the backward haul is commenced, the hook 8 automatically disengages itself from the overturning loop 15 and the bend of the hook is by the haul back line 10 drawn into engagement with the ring 16 of the bail 17, and by the action before explained, the wheels 20 are drawn under the scoop to relieve the backward haul. This relief, during the backward haul, is considered necessary as the backward haul is usually conducted at a higher rate of travel and is indirect, the rope passing around a snatch block at the end of the ground farther from the engine to reverse the direction of movement.

An effective excavating scoop is thus provided which may be used with an ordinary donkey engine having wire rope drums such as are used for logging or land clearing purposes and the various operations are conducted by a single line of wire rope haul.

The several operations of changing the location of connection to the scoop require a very small amount of attention as the manner in which the haul back line is connected to the hook 8 of the hauling line and passed through the end bails of the scoop enables the hook to automatically connect itself to the bail required.

Having now particularly described this invention and the manner of its use, I hereby declare that what I claim as new and desire to be protected in by Letters Patent, is:

1. An excavator bucket, comprising in combination a scoop having bottom, sides and back, a hauling bail pivotally connected to the sides of the scoop close to their front bottom corners said bail having a ring-like member in the middle line of the scoop, an excavating bail pivotally connected to the sides of the scoop above and behind the aforementioned hauling bail, an upsetting loop secured to the upper edge of the back of the scoop in the middle line, a haul back bail pivotally connected to the sides adjacent to the back and having an eye or ring in the middle line and coöperative therewith a hauling rope passed through the eye of the hauling bail and having a hook at the bend of which the haul back line is connected after passing through the eye or ring of the haul back bail.

2. An excavator bucket, comprising the combination with a scoop having bottom, sides and back, of a forward hauling bail including a ring and connected to the front end and a backward hauling bail including a ring and connected to the back end a haul back line freely passed through said ring of the forward hauling bail and through said ring of the backward hauling bail and having a hook introduced between the two bails.

3. An excavator bucket, comprising the combination with a scoop having bottom, sides and back, of a forward hauling bail pivotally connected to the front bottom corners of each side, an excavating bail pivotally connected to the sides of the scoop above and behind the aforementioned hauling bail, means for limiting the upward movement of the excavating bail in relation to the front edge of the scoop, an upsetting loop secured to the upper edge of the back of the scoop in the middle line, a haul back bail pivotally connected to the sides of the scoop adjacent to the back, and coöperative therewith a hauling rope passed through an eye on the hauling bail and having a hook to the bend of which a haul back line is connected after passing through an eye or ring of the haul back bail.

4. An excavator bucket, comprising the combination with a scoop having bottom, sides and back, of a forward hauling bail pivotally connected to the front bottom corner of each side, an excavating bail pivotally connected to the sides of the scoop above and behind the aforementioned hauling bail, an upsetting loop secured to the upper edge of the back of the scoop in the middle line, a haul back bail pivotally connected to the sides of the scoop toward the back, and in combination therewith a hauling line passed through a ring on the forward hauling bail and a ring on the backward hauling bail with a hook introduced in the line between the two bails.

In testimony whereof I have signed my name to this specification in the presence of two subscribing witnesses.

ARCHIBALD McGILLIS.

Witnesses:
ROWLAND BRITTAIN,
WILLIAM S. SOUTAR.